Inventor
John J. Erkkila

United States Patent Office 2,818,701
Patented Jan. 7, 1958

2,818,701

CAM-LEVER TOOL FOR COUPLING AND UNCOUPLING DETACHABLE DRIVE CHAIN LINKS

John J. Erkkila, Frederick S. Dak.

Application August 6, 1956, Serial No. 602,356

2 Claims. (Cl. 59—7)

This invention relates generally to a tool for link chains and more particularly a tool adapted to facilitate the connection and disconnection of links in a detachable link chain.

Chains of the type made up of a multiplicity of detachable links have found widespread use in industrial installations, with agricultural machinery and with other types of power operated machinery. Conventionally the links of the chain are produced either as steel stampings or as castings, each of which comprises a pair of spaced apart, relatively flat side members which are connected at one end by a bearing member and at the other end by a pintle member. The bearing and pintle portions of the link are designed to permit interlocking connection with other links to make up a strand of chain as is well understood in the art.

To prevent uncoupling of connected links except when desired the bearing and pintle members of the links are made a tight fit so that often a blow of a hammer is required to couple or uncouple the links. Frequently this results in damage to the links and consequently this method of coupling and uncoupling has not proved entirely satisfactory.

It is a general object of this invention to provide a tool for facilitating the coupling and uncoupling of the links in a detachable link chain.

It is another object of this invention to provide such a tool which is characterized by its ease of operation and economy of construction.

These and other objects are realized in accordance with the features of a specific illustrative embodiment of this invention in which a tool comprising a pair of actuating members pivotally connected together in scissors-like fashion is adapted to enable quick and easy connection and disconnection of one link with respect to another.

One of the pair of actuating members comprises an elongated handle having a U-shaped hook member at one end thereof. The other one of the pair of actuating members comprises an elongated handle having a cam edge at one end thereof. The actuating members are pivotally connected to each other in scissors-like fashion by means of a nut and bolt near their respective hook and cam portions such that the elongated handles afford substantial mechanical advantage in the operation of the tool.

The hook on one actuating member is adapted to be fitted over one of the flat side members of a link. The cam of the other actuating member engages the opposite flat side member of the adjacent link. In the operation of the tool the two actuating members are brought together and the action of the cam causes the link to be urged out of coupling engagement with the link held by the hook. Conversely, the tool may be used to couple a pair of links in that the hook of one actuating member is used to hold one link while the cam edge of the other actuating member urges a second link into coupling engagement with the first mentioned link.

The above and other features of novelty which characterize the invention are pointed out with particularity in the claims annexed to and forming a part of the specification. For a better understanding of this invention, however, its advantages and specific objects attained with its use, reference is had to the accompanying drawing and descriptive matter in which is shown and described several illustrative embodiments of the invention.

Figure 1:
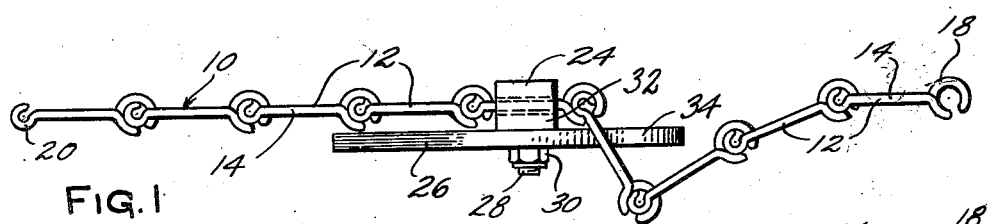
Figure 1 is a top plan view of a tool embodying the invention in use with a detachable link chain.
Figure 2:
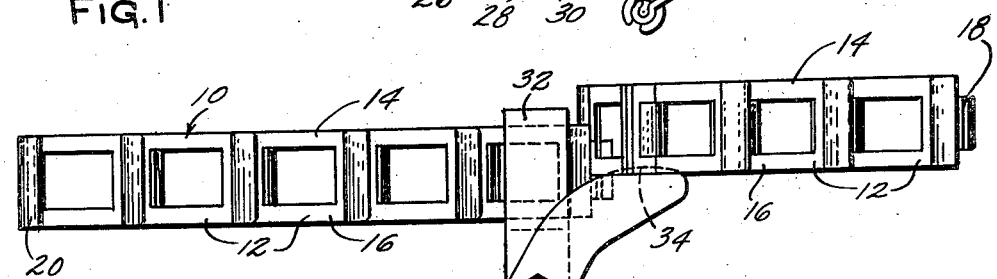
Figure 2 is a side elevational view of a tool embodying the invention in use with a detachable link chain.
Figure 3:
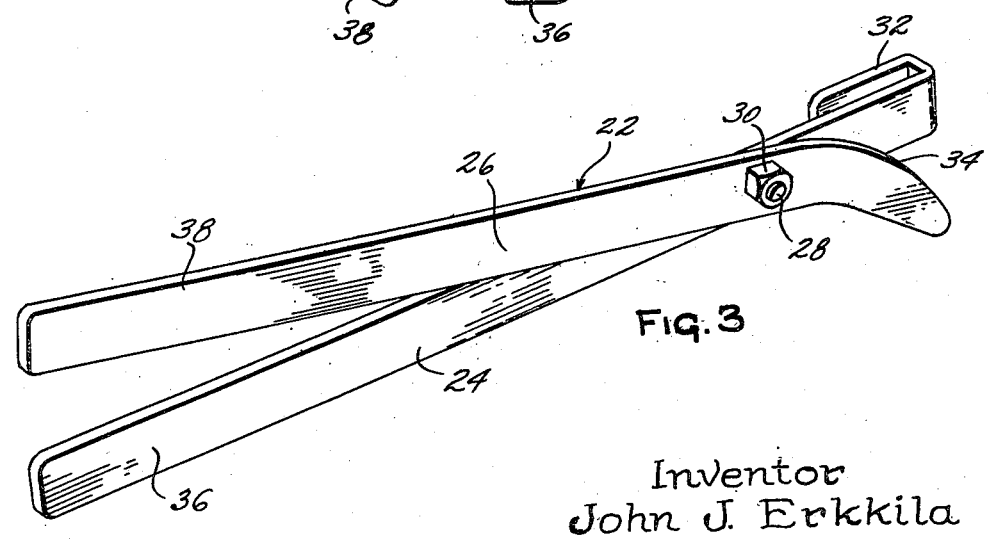
Figure 3 is a perspective view of a tool embodying the invention.

Referring now to the drawing, Figures 1 and 2 illustrate the use of a tool embodying the invention for the uncoupling of a pair of links in a detachable link chain. The chain 10 is formed of a number of more or less conventional links 12 which are constructed and arranged to be connected and disconnected with respect to each other. Each of the links 12 comprises a pair of transversely spaced apart, longitudinally extending, relatively flat side members 14 and 16. Side members 14 and 16 are connected at one end by a bearing member 18 and at the other end by a pintle member 20. Bearing and pintle members 18 and 20, respectively, are designed to permit interlocking connection of one link with another to make up a strand of chain as is well understood in the art.

The novel coupling and uncoupling tool 22 embodying the present invention comprises a pair of actuating members which hereinafter will be referred to as a holding leg 24 and an actuating leg 26. Holding leg 24 comprises a flat elongated handle 36 which has at one end thereof a U-shaped hook 32 formed by bending over one end of the holding leg to produce a pair of parallel spaced apart hook members. Advantageously the spacing of the hook members is slightly greater than the width of the link side members 14 and 16.

Actuating leg 26 comprises a flat elongated handle 38 which at one end thereof is formed with an angularly displaced arcuate cam 34 along one edge. Holding leg 24 and actuating leg 26 are pivotally connected together by means of a bolt 28 extending through the legs and a nut 30 threaded on bolt 28 to permit the legs to be operated in scissors-like fashion. Advantageously bolt 28 and nut 30 are connected to the legs near hook 32 and cam 34 to utilize the relatively large mechanical advantage inherent in elongated handles 36 and 38.

When it is desired to uncouple one link of the chain from an adjacent link, hook 32 of holding leg 24 is fitted over one of the relatively flat side members of the link in the manner shown in Figures 1 and 2. Cam 34 of actuating leg 26 is placed in engagement with the opposite side member 16 of the adjacent link. The latter link is angularly disposed relative to the former link to permit the links to be uncoupled and legs 24 and 26 are brought together. Cam 34 of the actuating leg urges its link upwardly and out of engagement with the adjacent link as the legs are brought together. Due to the mechanical advantage resulting from the relatively long lengths of handles 36 and 38 this may be done with relatively little effort. Thus, it will be appreciated that the novel tool has enabled the links to be uncoupled in a quick and easy manner.

Tool 22 also permits quick and easy coupling of the links in the chain. Thus, if the link shown in engagement with cam 34 in Figure 2 were below the adjacent link and disconnected therefrom, the bringing together of legs 24 and 26 would cause the former link to be urged upwardly and into coupling engagement with the link held by hook 32. Therefore, it will be appreciated that tool 22 may be utilized to facilitate either the coupling or uncoupling of links 12 in chain 10.

It will be understood by those skilled in the art that modifications may be made in the construction and arrangement of the parts of the above described tool for coupling and uncoupling detachable links without departing from the real purpose and spirit of the invention and that it is intended to cover by the appended claims any modified forms of structures, circuits or use of equivalents which reasonably may be included within their scope.

What is claimed is:

1. A tool adapted for use with a detachable link chain of the type having links formed of a pair of flat side members connected at one end by a bearing member and at the other end by a pintle member whereby the pintle member of one link is adapted for interlocking connection with the bearing member of an adjacent link, said tool comprising a first elongated, relatively wide, flat strap member, said strap member being transversely bent to form a U-shaped hook at one end thereof for gripping a side member of said one link and a second elongated, relatively wide, flat strap member having an elongated cam at one end thereof and engaging the edge of a side member on the opposite side of said adjacent link, and means adjacent said hook and said cam pivotally securing the second flat strap member to the side of the first flat strap member opposite that carrying the hook for enabling the members to effect the selective coupling and uncoupling of the links.

2. A tool in accordance with claim 1 wherein the width of said U-shaped hook in said first flat strap member is approximately equal to the dimension of a link side member between the bearing and the pintle member for enabling the tool to be properly locked on the link and for maintaining the links in operating position during the coupling and uncoupling operations.

References Cited in the file of this patent

UNITED STATES PATENTS

| 1,785,946 | Fox | Dec. 23, 1930 |
| 2,154,580 | Perrin | Apr. 18, 1939 |
| 2,267,660 | McPhail | Dec. 23, 1941 |
| 2,297,765 | Hoover | Oct. 6, 1942 |

FOREIGN PATENTS

| 158,554 | Germany | Mar. 3, 1905 |